United States Patent [19]

Schrag et al.

[11] Patent Number: 4,945,719
[45] Date of Patent: Aug. 7, 1990

[54] SQUARE BALER HAVING PLUNGER CLEANOUT APPARATUS

[75] Inventors: Thomas G. Schrag, Hesston; Lavern H. Unruh, Newton, both of Kans.

[73] Assignee: Hay & Forage Industries, Hesston, Kans.

[21] Appl. No.: 402,056

[22] Filed: Sep. 1, 1989

[51] Int. Cl.⁵ ............................................. A01D 39/00
[52] U.S. Cl. ............................................ 56/341; 56/1; 100/179
[58] Field of Search ................. 56/341, 343, 344, 448, 56/1, 131; 100/179, 180, 187, 189, 190, 88

[56] References Cited

U.S. PATENT DOCUMENTS

| | | | |
|---|---|---|---|
| 4,310,036 | 1/1982 | Rasmussen et al. | 100/189 |
| 4,428,282 | 1/1984 | Anstey | 56/341 |
| 4,444,098 | 4/1984 | Soteropulos | 100/88 |
| 4,604,858 | 8/1986 | Esau et al. | 56/341 |
| 4,829,756 | 5/1986 | Schrag et al. | 56/341 |

Primary Examiner—Jerome W. Massie, IV
Assistant Examiner—Terry Lee Melius
Attorney, Agent, or Firm—Hovey, Williams, Timmons & Collins

[57] ABSTRACT

A baler includes a bale chamber and a plunger movable relative to the chamber between a retracted position and an extended position. The plunger is provided with at least two crop engaging elements spaced from one another by a distance defining a clearance opening therebetween, and a drive crank assembly including a drive arm operates to shift the plunger between the retracted and extended positions in a series of operating cycles. A clearing assembly is included for clearing crop materials from at least a portion of the clearance opening in the plunger. The clearing assembly includes a clearing member mounted on the plunger for pivotal movement relative thereto about a pivot axis, and a drive link for effecting pivotal movement of the clearing member during shifting of the plunger between the retracted and extended positions.

10 Claims, 3 Drawing Sheets

SQUARE BALER HAVING PLUNGER CLEANOUT APPARATUS

BACKGROUND OF THE INVENTION

1. Field of the Invention

The present invention relates generally to square bale forming apparatuses and, more particularly, to a cleanout assembly for cleaning interior regions of a plunger of a square bale forming apparatus which might otherwise become congested with materials that would be carried upward by knotting needles and become entangled in an overhead knotting device.

2. Discussion of the Prior Art

A square baler having plunger cleanout means is known from U.S. Pat. No. 4,829,756, issued on May 16, 1989, and assigned to the assignee of the present invention. The baler apparatus illustrated in U.S. Pat. No. 4,829,756, is substantially similar to the general type of baler with which the present invention is to be employed and, therefore, the disclosure of U.S. Pat. No. 4,829,756 is hereby expressly incorporated herein by reference.

The known plunger cleanout means basically includes a plurality of probes for clearing crop materials from clearance openings in a plunger head of the baler so that an apparatus, such as a curved needle, may pass up through the clearance openings without hinderance. The probes are mounted between a pair of drive arms of the baler for shiftable movement relative to the plunger head along a path of sweeping motion within the head during at least a portion of the operating cycle of the plunger head.

By this construction, the probes of the known plunger cleanout means provide a cleaning of the clearance openings between the plurality of crop engaging elements of the plunger head by moving along an arcuate path defined by the axis of rotation of the drive arm relative to the plunger head.

Although the known plunger cleanout construction performs the desired function in many diverse conditions under which the known baler may operate, it is possible in certain conditions for material to become lodged in the clearance openings between the crop engaging elements of the plunger head in and around a lower frame member of the plunger head in such a way that the probes, moving along the arcuate lines defined by the axis of rotation of the drive arm, are unable to clear the crop material sufficiently from around the frame member. In such circumstances, the crop material may build up in the clearance openings to a size sufficient to cause bending or breaking of the needles passing up through the openings during tying of the bale in the chamber or may be carried with the needles up into the knotting device.

It would be desireable to provide a plunger cleanout assembly which reliably cleans the clearance openings in a plunger head during operation of the baler under any conditions encountered so that the baler may be used in a wide variation of environments without experiencing problems with the tying needles carrying material into the knotting device or becoming bent or broken by crop material lodged in the clearance openings.

OBJECTS AND SUMMARY OF THE INVENTION

One object of the present invention is to provide a baler including, among other features, clearing means for clearing crop materials from at least a portion of the clearance opening in the plunger, the clearing means including a clearing member supported by the plunger for pivotal movement relative thereto along a path extending through a region of the clearance opening in which a substantial portion of crop material tends to gather such that the crop material is substantially cleared from the opening.

In accordance with this and other objects, the baler of the present invention includes a plunger movable relative to the chamber of the baler between a retracted position and an extended position, the plunger including at least two crop engaging elements spaced from one another by a distance defining a clearance opening therebetween. Drive means are provided for shifting the plunger between the retracted and extended positions in a series of operating cycles, the drive means including an arm pivotally connected to the plunger for movement about a first pivot axis relative to the plunger. Clearing means to clear crop materials from at least a portion of the clearance opening in the plunger, the clearing means including a clearing member supported by the plunger for pivotal movement relative thereto about a second pivot axis, and means for effecting pivotal movment of the clearing member during shifting of the plunger between the retracted and extended positions.

By this construction numerous advantages are realized over known plunger cleanout devices. For example, by supporting the clearing member of members directly on the plunger for movement about an axis different from the axis of rotation of the drive arm, it is possible to orient the clearing member on the plunger for movement through a region found to be most densely filled with crop material. Typically, where the plunger includes a frame member extending transverse of the plunger, this region of dense crop material collection is found immediately adjacent the frame member since the crop material becomes lodged between the plunger elements and the frame member.

Another advantage resulting from the construction of the inventive baler includes the ability to provide a cleanout element capable of cleaning the regions both aabove and below the transverse frame element such that material is effectively cleared from around the frame member without becoming lodged in the openings between the crop engaging elements.

BRIEF DESCRIPTION OF THE DRAWING FIGURES

A preferred embodiment of the invention is discussed in detail below with reference to the attached drawing figures, wherein.

DETAILED DESCRIPTION OF THE PREFERRED EMBODIMENT

Figure 1:
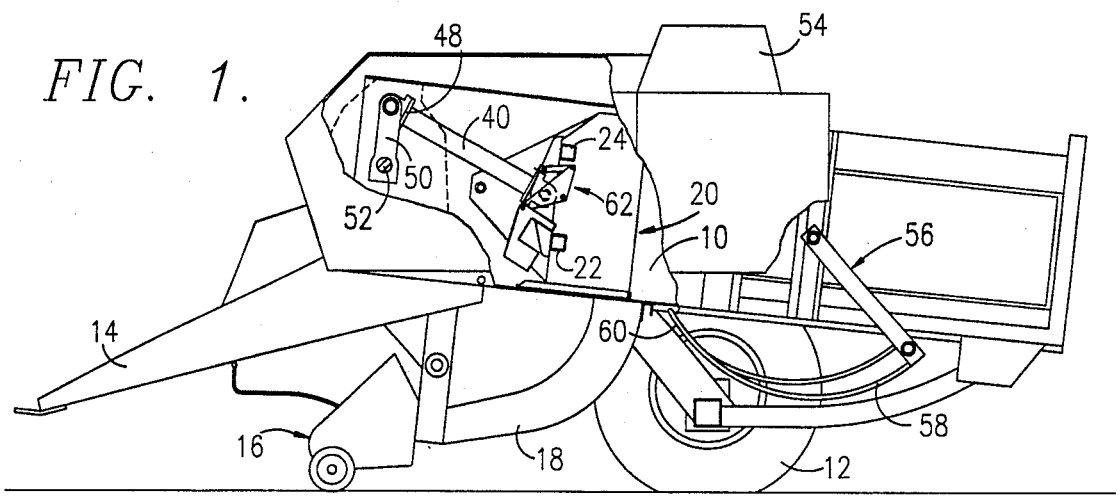
FIG. 1 is a side elevation view, partially in section, of a baler constructed in accordance with the present invention, partially broken away to show a plunger and its associated drive and cleanout assemblies.

A preferred embodiment of a baler constructed in accordance with the present invention is illustrated in FIG. 1. As shown in the figure, the baler includes walls defining an elongated baling chamber 10 that extends along the longitudinal axis of the baler and that includes a rectangular cross-sectional shape. A pair of wheels 12 support the baler and a tongue 14 is provided for permitting connection of the baler to a towing vehicle (not shown).

A wheeled pick-up unit 16 is disposed at a lower front side of the baler that delivers crop material to the mouth of a charge chamber 18 located beneath the baling chamber 10. Stuffing means (not shown) are provided in the charge chamber 18 for packing the charge chamber full of crop materials and, thereafter, sweeping the packed crop materials upward into the baling chamber 10.

Figure 5:
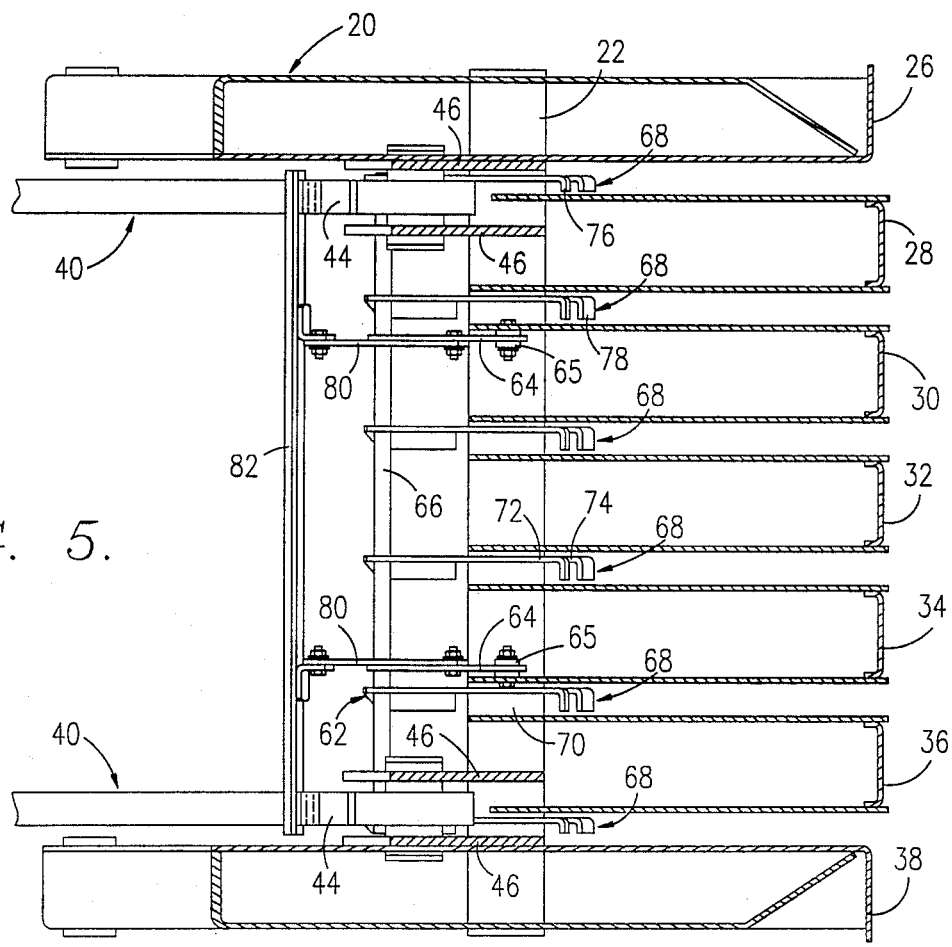
FIG. 5 is a top sectional view of the plunger and plunger cleanout assembly.

A plunger 20 is mounted within the baling chamber for reciprocating movement in order to compress a charge of materials received from the charge chamber 18 against previously admitted materials in order to form a compacted bale. The plunger 20 includes a pair of transverse, vertically spaced frame members 22, 24 which are generally square in transverse cross-section and which support seven crop engaging elements 26-38 in spaced relationship to each other as illustrated in FIG. 5. These crop engaging elements 26-38 define a crop engaging face of the plunger 20 which contacts the crop material and, together with the walls of the baling chamber, compresses it into a bale.

The two outermost elements 26, 38 of the plunger 20 are formed somewhat longer than the remaining elements 28-36 and extend in a direction toward the front of the baler as shown in FIG. 5. These outermost elements each carry two horizontally spaced rollers which ride in tracks connected to the sidewalls defining the baling chamber and support the plunger for shifting movement in a direction generally parallel to the longitudinal axis of the chamber 10.

The plunger 20 includes a drive means for shifting the crop engaging elements 26-38 through an operating cycle comprising an alternating series of crop compaction strokes followed by retraction strokes. The drive means includes a pair of drive arms 40, shown in FIG. 4, each having a rear portion 42 connected by brackets 46 fixed to the frame members 22, 24 of the plunger 20.

Returning to FIG. 1, a forward portion 48 of each drive arm 40 is pivotally connected to one end of a drive crank 50 that is fixed to and rotates simultaneously with a horizontally extending drive shaft 52. Thus, rotation of the shaft 52 and crank 50 swings the drive arms 40 through a reciprocating path of travel to shift the plunger 20 through its operating cycle while the latter is supported for substantially linear motion within the baling chamber 10.

A knotting device (not shown) is located beneath a top wall 54 of the baler above the baling chamber 10 and operates in conjunction with a needle apparatus 56 for carrying strands of baling line to the knotting device. The needle apparatus 56 includes a plurality of curved needles 58 each having an uppermost tip 60 that periodically transports ends of strands of the baling line up through the plunger 20 to the knotting device to enable the knotting device to tie the line around a compacted, formed bale.

As illustrated in FIG. 5, six upright slots or clearance openings are defined between adjacent pairs of the spaced plunger elements 26-38. Although not shown in FIG. 5, six needles are provided on the needle apparatus 56 that are constructed and arranged to pass through the clearance openings along an arcuate path when the bale is fully formed and the plunger 20 is extended near the end of its compaction stroke. The tips 60 of the needles 58 each pass closely adjacent the respective portions of the lower frame member 22 and hence tend to pick up materials lodged adjacent to and around the frame member 22 and carry the materials toward the knotting device.

As thus far described, the baler is substantially as disclosed in U.S. Pat. No. 4,829,756. However, in order to improve the cleaning out of the clearance openings in the region of the lower frame member 22, an improved clearing means is provided, as shown in FIGS. 1-6, for clearing crop materials which includes a clearing member 62 supported by the plunger 20 for pivotal movement relative thereto along a path extending through a region of the clearance openings in which a substantial portion of crop material tends to gather such that the crop material is substantially cleared from the openings.

Figure 2:
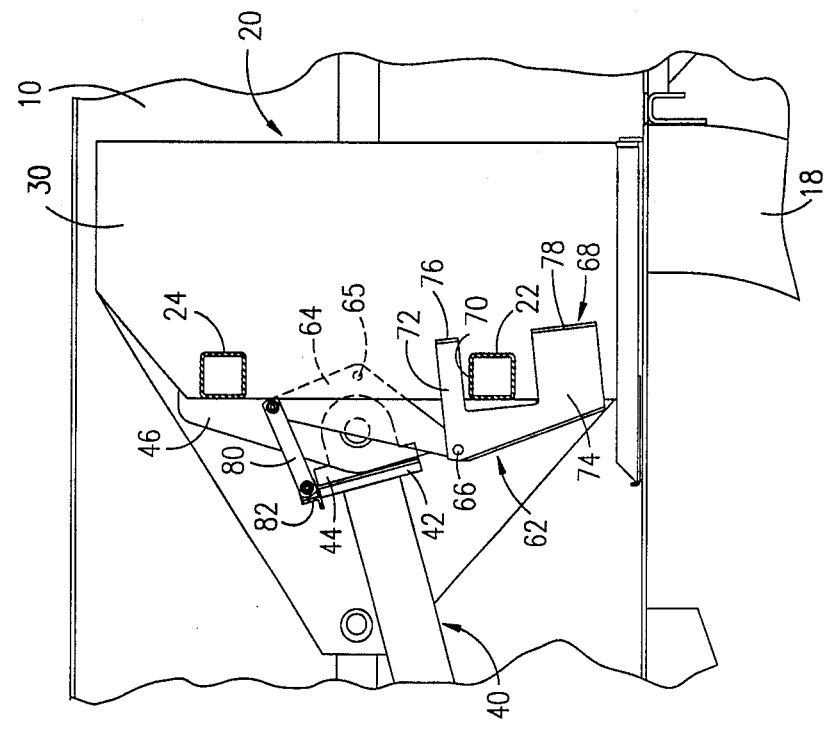
FIG. 2 is an enlarged side sectional view of a plunger and the drive and cleanout assemblies, with the clearing member shown in a fully retracted position relative to the plunger.
Figure 3:
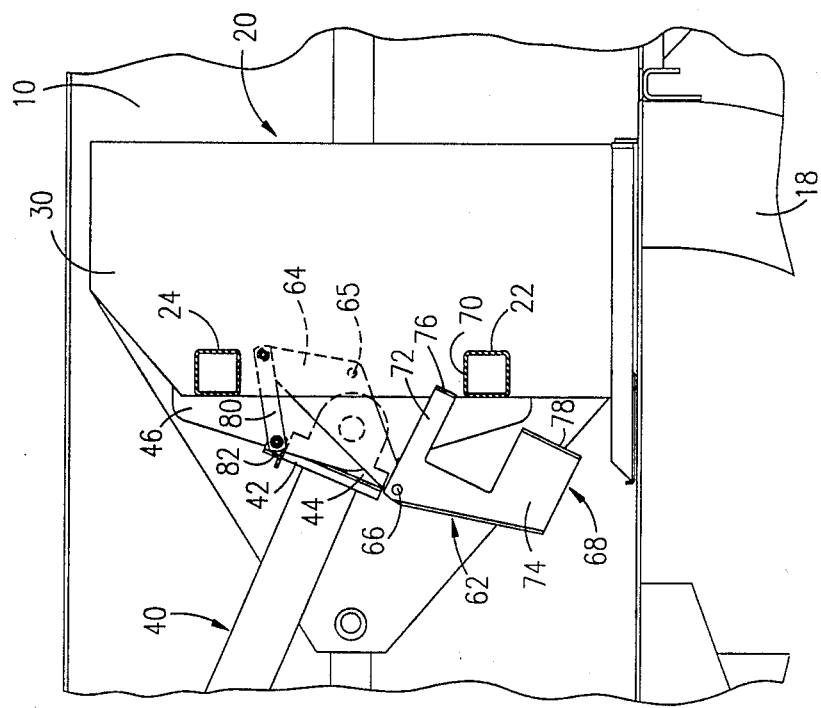
FIG. 3 is an enlarged side sectional view similar to FIG. 2, with the clearing member shown in a fully extended position relative to the plunger.

The clearing member 62 is shown in detail in FIGS. 2 and 3, and includes a pair of triangular plates 64 supported on the crop engaging elements 30, 34 of the plunger 20 for pivotal movement about an axis 65 extending transverse of the plunger and immediately above the lower frame member 22. An elongated rod 66, shown in FIG. 5, also extends transverse of the plunger and is secured to the triangular plates 64 so as to be prevented from moving relative to the plates 64 during pivoting movement of the clearing member 62 relative to the plunger. The elongated rod 66, in turn, supports six sweeping elements 68 thereon in such a way that the sweeping elements are prevented from moving relative to either the rod 66 or the triangular plates 64 during movement of the clearing member 62 relative to the plunger. Thus, the clearing member 62 moves as a single unitary piece about the pivot axis 65 on the plunger 20 whenever the plunger is shifted between its fully retracted and fully extended positions within the bale chamber.

By constructing the clearing member 62 in this manner, numerous advantages are realized. For example, by supporting the clearing member directly on the plunger 20, the weight of the clearing member is easily borne by the triangular plates 64 and the crop engaging elements 30, 34 of the plunger without the need for additional reinforcement in the drive arms 40 or other parts of the baler. In addition, by locating the pivot axis 65 of the clearing member immediately above the lower frame member 22, the sweeping elements 68 are disposed for movement along an arcuate path which traverses at least the entire upper surface 70 of the lower frame member 22 such that any material resting on top of the frame member is swept away from the member and removed from between adjacent crop engaging elements of the plunger.

As shown in FIG. 3, the sweeping element includes an upper portion 72 and a lower portion 74, which travel along paths extending on different sides of the lower frame member 22. Both the upper and lower portions 72, 74 of each of the elements 68 are formed of a plate having a thickness substantially smaller than the width of the clearance openings between the crop engaging elements 26-38 of the plunger 20.

In addition, a flange 76, 78 is formed at the end of each of the portions 72, 74 respectively, which extends in a direction substantially perpendicular to the portions to present an enlarged sweeping surface to the clearance openings. While the sweeping elements 68 move toward the position shown in FIG. 3, during a first cyclical cleaning operation, the flanges 76, 78 push material caught in the clearance openings rearward of the plunger 20 toward the baling chamber 10. Thereafter, during a second cyclical cleaning operation, the sweeping elements move away from the position shown in FIG. 3, toward the position illustrated in FIG. 2, thus pulling loose material forward of the plunger so that the material falls from the clearance openings in front of the lower frame member 22.

Although the flange 78 of the lower sweeping element portion 74 is illustrated in the drawing figures as being substantially parallel to the flange 76 of the upper portion 72, it is noted that the lower flange may be formed at any different desired angle which provides a beneficial cleaning of the clearance space immediately beneath the frame member. For example, the flange 78 of the lower portion 74 may be swept back or angled so that the upper end of the flange is located closer to the face of the plunger than the bottom end of the flange.

Figure 4:
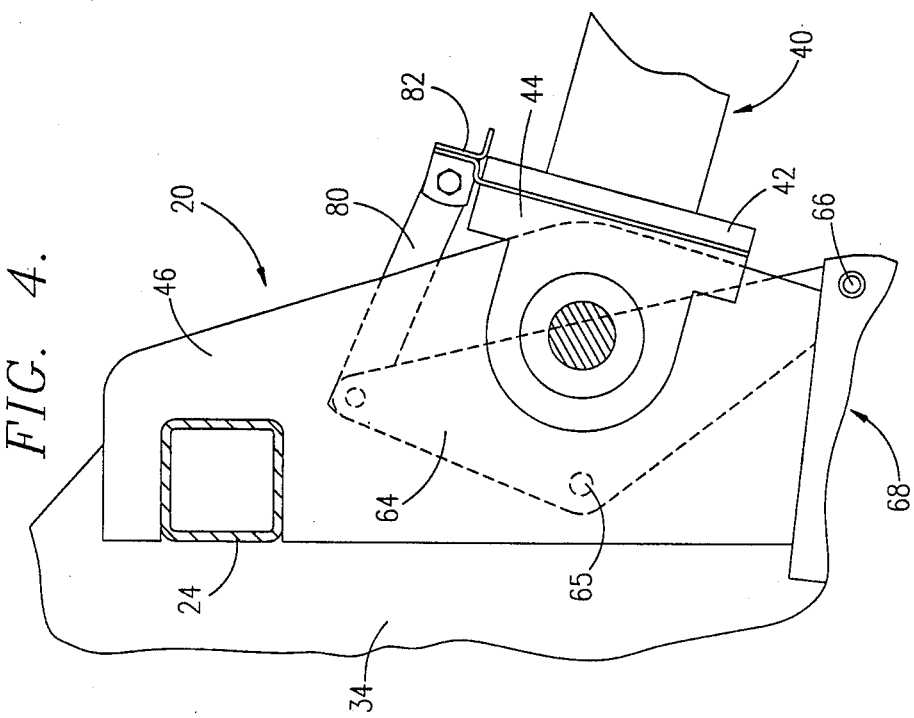
FIG. 4 is an enlarged side sectional view of the connection between the drive arm and the plunger.

The movement of the clearing member 62 discussed above is carried out by a drive means including a pair of links 80 such as those illustrated in FIG. 5, which are pivotally connected at one end thereof to the triangular plates 64, and which are pivotally connected at the opposite ends thereof to a cross-member 82 extending between the drive arms 40 of the plunger drive means. As shown in FIG. 4, the cross-member 82 is attached to each of the drive arms 40 by an upwardly extending tongue 84 that is clamped between the rear portion 42 of the arm and the collar 44. The tongue 84 is bent to permit movement of the arms 40 relative to the plunger 20 along the entire desired arcuate path of travel thereof.

During movement of the plunger toward its retracted position, the drive arms 40 move downward, pulling the cross-member 82 and links 80 therealong. By this action, the triangulr plates 64 are caused to pivot about the axis 65 such that the sweeping elements, which are rigidly attached to the plates 64 through the rod 66, move from the position shown in FIG. 2 toward the position of FIG. 3.

Because the cross-member 82 provides only the driving force to the clearing member 62, and is not relied upon as a support for the weight of the member 62, it is not necessary that the cross-member be reinforced with additional thickness of structure even though the clearing member is substantially heavier than known clearing assemblies.

Figure 6:
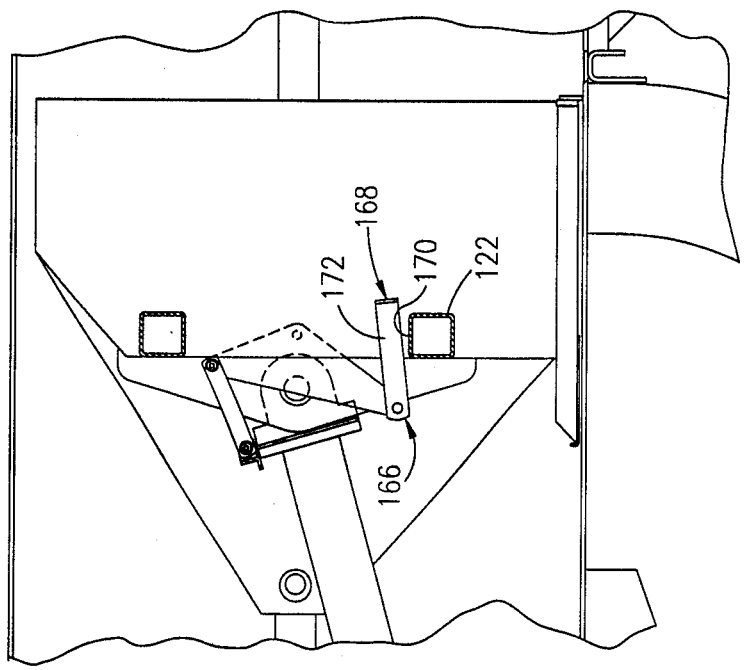
FIG. 6 is an enlarged side sectional view of a plunger and the drive and cleanout assemblies, wherein the cleanout assembly is provided with a modified sweeping element.

Turning to FIG. 6, a modified construction of a sweeping element 168 is shown which includes only an upper portion 172 mounted on the clearing member 162 for travel along a path extending above and in close proximity to the upper surface 170 of the lower frame member 122. This construction of the sweeping member is otherwise similar to the elements discussed above and operates in substantially the same manner.

Although the invention has been described with reference to the preferred emodiment illustrated in the attached drawing figures, it is noted that substitutions may be made and equivalents employed herein without departing from the scope of the invention as set forth in the claims. For example, although in the preferred embodiment the clearing member is disclosed as comprising a unitary piece, it is possible to provide an arrangement whereby a plurality of relatively movable clearing assembly elements are provided which slide, pivot or swing relative to one another in order to move a sweeping element through a sweeping path extending immediately adjacent the upper and/or lower surfaces of the lower frame member of the plunger.

What is claimed is:

1. A baler comprising:
   a bale chamber;
   a plunger movable relative to the chamber along a substantially linear path between a retracted position and an extended position, the plunger including at least two crop engaging elements spaced from one another by a distance defining a clearance opening therebetween;
   shifting means for shifting the plunger between the retracted and extended positions in a series of operating cycles, the shifting means including an arm pivotally connected to the plunger for movement about a first pivot axis relative to the plunger;
   clearing means for clearing crop materials from at least a portion of the clearance opening in the plunger, the clearing means including a clearing member mounted directly on the plunger for pivotal movement relative thereto about a second pivot axis, and drive means for effecting pivotal movement of the clearing member during shifting of the plunger between the extended and retracted positions,
   said drive means includes a drive link connected between the clearing member and the arm of the shifting means, the drive link being pivotally connected to the clearing member at a position spaced from the second pivot axis.

2. The baler as recited in claim 1, wherein the clearing member includes at least one sweeping element movable relative to the plunger within the clearance opening to sweep crop materials from the clearance opening as the plunger moves from the extended position toward the retracted position and as the plunger moves from the retracted position toward the extended position.

3. The baler as recited in claim 1, wherein the plunger includes at least one transverse frame member extending across the clearance opening, the sweeping element including a first sweeping portion disposed for movement along a path extending above the frame member and a second sweeping portion disposed for movement along a path extending beneath the frame member.

4. The baler as recited in claim 3, wherein the first and second sweeping portions each include a flange extending in the transverse direction of the plunger, the flanges serving to sweep and clear material from the clearance opening of the plunger during movement of the sweeping element.

5. The baler as recited in claim 5, wherein the flange of the second sweeping portion is angled relative to the flange of the first sweeping portion.

6. A clearing assembly for use in clearing crop materials from between a plurality of crop engaging elements of a plunger, wherein the plunger is shifted by a drive arm about a first pivot axis between a retracted position and an extended position within a bale chamber of a baler, the assembly comprising:

a clearing member mounted directly on the plunger for pivotal movement relative thereto about a second pivot axis; and drive means for effecting pivotal movment of the clearing member during shifting of the plunger between the retracted and extended positions, the drive means including a drive link connected between the clearing member and the drive arm, the drive link being pivotally connected to the clearing member at a position spaced from the second pivot axis.

7. The baler as recited in claim 6, wherein the clearing member includes at least one sweeping element movable relative to the plunger between the crop engaging elements to sweep crop materials therefrom as the plunger moves between the extended and retracted positions.

8. The baler as recited in claim 6, wherein the sweeping element includes a first sweeping portion disposed for movement along a first, upper path extending between the crop engaging elements and a second sweeping portion disposed for movement along a second, lower path between the crop engaging elements.

9. The baler as recited in claim 8, wherein the first and second sweeping portions each include a flange extending in the transverse direction of the plunger, the flanges serving to sweep and clear material from between the crop engaging elements during movement of the sweeping element.

10. The baler as recited in claim 9, wherein the flange of the second sweeping portion is angled relative to the flange of the first sweeping portion.

* * * * *